US012164963B1

(12) United States Patent
Luttwak et al.

(10) Patent No.: US 12,164,963 B1
(45) Date of Patent: Dec. 10, 2024

(54) TECHNIQUES FOR DETECTING AI PIPELINES IN CLOUD COMPUTING ENVIRONMENTS

(71) Applicant: Wiz, Inc., New York, NY (US)

(72) Inventors: Ami Luttwak, Binyamina (IL); Alon Schindel, Tel Aviv (IL); Amitai Cohen, Kfar Saba (IL); Yinon Costica, Tel Aviv (IL); Roy Reznik, Tel Aviv (IL); Mattan Shalev, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/511,623

(22) Filed: Nov. 16, 2023

(51) Int. Cl.
*G06F 9/50* (2006.01)
*G06F 11/34* (2006.01)

(52) U.S. Cl.
CPC ........ *G06F 9/5016* (2013.01); *G06F 11/3433* (2013.01)

(58) Field of Classification Search
None
See application file for complete search history.

(56) References Cited

U.S. PATENT DOCUMENTS

| 10,558,823 | B2 | 2/2020 | Schroeder et al. | |
| 11,238,377 | B2 * | 2/2022 | Polleri | G06N 20/00 |
| 2022/0030009 | A1 | 1/2022 | Hasan | |
| 2023/0297863 | A1 * | 9/2023 | Chen | G06F 8/443 |
| | | | | 706/12 |

* cited by examiner

*Primary Examiner* — Eric C Wai
(74) *Attorney, Agent, or Firm* — M&B IP Analysts, LLC (57) ABSTRACT

A system and method detecting an artificial intelligence (AI) pipeline in a cloud computing environment. The method includes: inspecting a cloud computing environment for an AI pipeline component; detecting a connection between a first AI pipeline component and a second AI pipeline component; generating a representation of each of: the first AI pipeline component, the second AI pipeline component, and the connection, in a security database; and generating an AI pipeline based on the generated representations.

19 Claims, 5 Drawing Sheets

TECHNIQUES FOR DETECTING AI PIPELINES IN CLOUD COMPUTING ENVIRONMENTS

TECHNICAL FIELD

The present disclosure relates generally to detecting artificial intelligence pipelines, and specifically to implementing cybersecurity monitoring solutions across multiple cloud computing environments of artificial intelligence pipelines.

BACKGROUND

Artificial intelligence (AI) applications are increasingly prevalent, as costs of computing hardware have plummeted significantly, and as AI models have improved their computational resource consumption.

This explosion in AI applications, with a rush to deploy AI solutions in various endeavors, presents new cybersecurity risks. Security teams lack knowledge and experience in AI systems, which can lead to vulnerabilities in implementations. AI systems are complex and ever-evolving, require new software tools that security teams may not be aware of, and also do not always have cybersecurity awareness about.

For example, an AI model may leak data, for example exposing sensitive data, secrets, etc. An AI model may be vulnerable to manipulation, such as by poisoning the training data. As with any rapidly evolving technology, the pace of evolution means that attackers can find an advantage over security teams.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include inspecting a cloud computing environment for an AI pipeline component. Method may also include detecting a connection between a first AI pipeline component and a second AI pipeline component. Method may furthermore include generating a representation of each of: the first AI pipeline component, the second AI pipeline component, and the connection, in a security database. Method may in addition include generating an AI pipeline based on the generated representations. Other embodiments of this aspect include corresponding computer systems, apparatus, and computer programs recorded on one or more computer storage devices, each configured to perform the actions of the methods.

Implementations may include one or more of the following features. Method may include: inspecting a workload of the cloud computing environment to detect an AI service. Method may include: inspecting a workload of the cloud computing environment to detect an AI model, where the AI model is stored in a disk associated with the workload. Method may include: generating a clone of the disk associated with the workload; and inspecting the clone of the disk for the AI model. Method may include: releasing the clone of the disk in response to determining that inspection of the clone of the disk is complete. Method may include: detecting the AI model in a production environment. Method may include: detecting the AI model further in any one of: a test environment, a staging environment, a development environment, and any combination thereof. Method may include: inspecting the first AI pipeline component for any one of: a software development kit (SDK), a library, an application, a framework, a service, a training data, an extension, a plugin, and any combination thereof. Method may include: detecting an AI Software as a Service (Saas) connected to the cloud computing environment; and updating the AI pipeline to include the AI SaaS. Method may include: detecting an AI Platform as a Service (PaaS) connected to the cloud computing environment; and updating the AI pipeline to include the AI PaaS. Implementations of the described techniques may include hardware, a method or process, or a computer tangible medium.

In one general aspect, non-transitory computer-readable medium may include one or more instructions that, when executed by one or more processors of a device, cause the device to: inspect a cloud computing environment for an AI pipeline component. Medium may furthermore detect a connection between a first AI pipeline component and a second AI pipeline component. Medium may in addition generate a representation of each of: the first AI pipeline component, the second AI pipeline component, and the connection, in a security database. Medium may moreover generate an AI pipeline based on the generated representations. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: inspect a cloud computing environment for an AI pipeline component. System may in addition detect a connection between a first AI pipeline component and a second AI pipeline component. System may moreover generate a representation of each of: the first AI pipeline component, the second AI pipeline component, and the connection, in a security database. System may furthermore include generating an AI pipeline based on the generated representations. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect a workload of the cloud computing environment to detect an AI service.

System where the memory contains further instructions which when executed by the processing circuitry further configure the system to: inspect a workload of the cloud computing environment to detect an AI model, where the AI model is stored in a disk associated with the workload. System where the memory contains further instructions which when executed by the processing circuitry further configure the system to: generate a clone of the disk associated with the workload; and inspect the clone of the disk for the AI model. System where the memory contains further instructions which when executed by the processing circuitry further configure the system to: release the clone of the disk in response to determining that inspection of the clone of the disk is complete. System where the memory contains further instructions which when executed by the processing circuitry further configure the system to: detect the AI model in a production environment. System where the memory contains further instructions which when executed by the processing circuitry further configure the system to: detect the AI model further in any one of: a test environment, a staging environment, a development environment, and any combination thereof. System where the memory contains further instructions which when executed by the processing circuitry further configure the system to: inspect the first AI pipeline component for any one of: a software development kit (SDK), a library, an application, a framework, a service, a training data, an extension, a plugin, and any combination thereof. System where the memory contains further instructions which when executed by the processing circuitry further configure the system to: detect an AI Software as a Service (Saas) connected to the cloud computing environment; and update the AI pipeline to include the AI SaaS. System where the memory contains further instructions which when executed by the processing circuitry further configure the system to: detect an AI Platform as a Service (PaaS) connected to the cloud computing environment; and update the AI pipeline to include the AI PaaS. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating an AI pipeline. In an embodiment, an AI pipeline representation is generated. In some embodiments, the AI pipeline representation includes AI components detected across multiple cloud computing environments. In certain embodiments, the multiple cloud computing environments are not otherwise connected.

Figure 1:
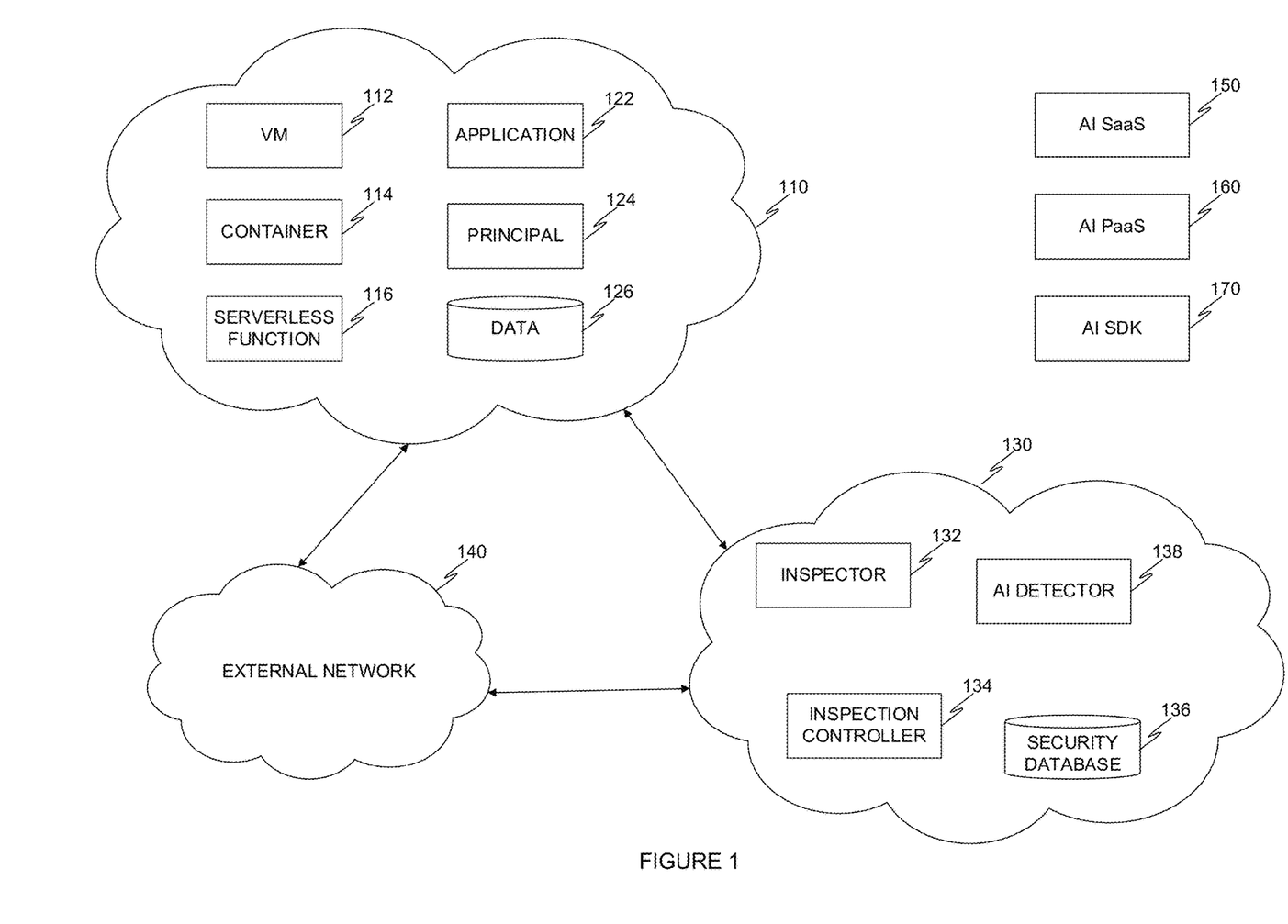
FIG. 1 is an example schematic illustration of a cloud computing environment for supporting an artificial intelligence (AI) pipeline, utilized to describe an embodiment.

FIG. 1 is an example schematic illustration of a cloud computing environment for supporting an artificial intelligence (AI) pipeline, utilized to describe an embodiment. In an embodiment, a cloud computing environment 110 includes cloud entities, such as resources, principals, and the like.

In certain embodiments, the cloud computing environment 110 is implemented as a tenant, as a virtual private cloud (VPC), as a virtual network (VNet), a combination thereof, and the like. In some embodiments, the cloud computing environment 110 is deployed on a cloud computing infrastructure, such as Amazon® Web Service (AWS), Google® Cloud Platform (GCP), Microsoft® Azure, and the like.

In an embodiment, a resource is a cloud entity which exposes hardware resources (e.g., provides access to a processor, a memory, a storage, a combination thereof, and the like), exposes services, exposes an application programming interface (API), a combination thereof, and the like.

In some embodiments, a principal is a cloud entity which is authorized to initiate actions in the cloud computing environment 110, authorized to act on a resource, a combination thereof, and the like.

For example, according to an embodiment, a principal is a user account, a service account, a role, a combination thereof, and the like. In some embodiments, a resource is a virtual machine, a software container, a serverless function, an application, a database, a combination thereof, and the like.

In certain embodiments, a virtual machine 112 is deployed in the cloud computing environment 110. In some embodiments, the virtual machine 112 is implemented as Oracle® VirtualBox®, for example. In an embodiment, the virtual machine 112 is associated with a disk (not shown).

In an embodiments, a software container 114 is deployed in the cloud computing environment 110. In some embodiments, the software container 114 is implemented utilizing a Kubernetes® Platform, a Docker® container engine, a combination thereof, and the like.

According to an embodiment, a serverless function 116 is deployed in the cloud computing environment 110. In certain embodiments, the serverless function 116 is implemented as an Amazon® Lambda® service.

In some embodiments, an application 122 is deployed in the cloud computing environment. In an embodiment, an application is deployed utilizing a resource, a plurality of resources, and the like. In some embodiments, an application 122 includes a software library, a software binary, an executable code, a combination thereof, and the like.

In an embodiment, the application 122 is a component of an artificial intelligence (AI) pipeline. According to an embodiment, an AI pipeline is utilized to provide a service utilizing an AI model. For example, in an embodiment, an AI pipeline includes software components, such as an AI model, a training data, an API, a combination thereof, and the like. In some embodiments, an AI pipeline includes resource components such as a serverless function 116, a software container 114, a virtual machine 112, a combination thereof, and the like.

For example, in an embodiment, an application 122 is hosted on a virtual machine 112. A serverless function 116 is configured to receive a prompt, which is then directed to an AI model, such as a large language model (LLM) to produce an output.

In an embodiment, the AI model is trained on a data set stored, for example, in a database 126. In some embodiments, an AI model is trained on a database 126 in a first cloud computing environment (e.g., a development environment), and the application 122 is deployed in a second cloud computing environment (e.g., a production environment). According to some embodiments, this presents a challenge, for example where the database 126 includes sensitive information which is used to train the AI model, but the data itself should not become exposed through use of the AI model.

In an embodiment, an AI model includes an artificial neural network (ANN), a recurrent neural network (RNN), a convolutional neural network (CNN), a generative adversarial neural network (GAN), a Bayesian network, a hidden Markov model, a large language model (LLM), a combination thereof, and the like.

In an embodiment, an AI pipeline includes resources, principals, and the like, which are utilized in providing a service based, for example, on an AI model. In an embodiment, a first component of the AI pipeline is connected to a second component of the AI pipeline, for example by a network policy allowing the first component to access the second component.

In some embodiments, the cloud computing environment 110 is accessible by an eternal network 140. In an embodiment, the external network 140 includes computing devices, user accounts, and the like, which are not affiliated with the cloud computing environment 110, but receive a service, access to a resource, access to an application, a combination thereof, and the like. According to an embodiment, the external network 140 is, for example, the Internet.

In certain embodiments, the cloud computing environment 110 is monitored for cybersecurity objects, threats, risks, and the like, by an inspection environment 130. In an embodiment, the inspection environment 130 is configured to monitor the cloud computing environment 110 for cybersecurity objects, threats, risks, combinations thereof, and the like.

In some embodiments, an inspector 132 is configured to inspect a workload of the cloud computing environment 110 for a cybersecurity object. An inspector 132 is implemented, in certain embodiments, as a resource, such as a virtual machine, a software container, a serverless function, a combination thereof, and the like. In some embodiments, it is advantageous to implement the inspector 132 as a node in software container, as this allows scaling of the inspection environment 130 to accommodate the inspection needs of the cloud computing environment 110.

In certain embodiments, an inspector 132 is configured to inspect a workload for a cybersecurity object such as a hash, a malware, a signature, an application, an operating system, a binary, a library, a computer code object, a code object of an infrastructure as code file, a registry file, a password stored as text (e.g., cleartext, plaintext, etc.), a certificate, a cryptographic key, a vulnerability, an exposure, a misconfiguration, a combination thereof, and the like.

For example, according to an embodiment, an inspector 132 is configured to detect a misconfiguration based on configuration rules. In an embodiment, a configuration rule is applied to a representation of a cybersecurity object, a representation of a workload, a representation of a principal, a combination thereof, and the like.

In an embodiment, an inspector 132 is configured to detect a component of an AI pipeline. In an embodiment, a component of an AI pipeline includes a model (e.g., stored as a file on a storage, a repository, and the like), a database, a training dataset, a serverless function configured to train the AI model using the training dataset stored on the database, an AI application, an AI application endpoint, an API, a combination thereof, and the like.

In certain embodiments, the inspector 132 is configured to detect a network path between an external network 140, and a component of the AI pipeline. For example, in an embodiment, a network path includes resources, applications, and the like, between the external network path 140, and the application 122. In some embodiments, where the network path exposes a resource, exposes data, and the like, to the external network, the network path is determined to be an exposure path.

In some embodiments, the inspector 132 is configured to query a cloud API to detect cloud entities, such as resources and principals, in the cloud computing environment 110. In certain embodiments, the inspector 132 is configured to query a Platform as a Service (PaaS) to detect an assistant, a list of assistant files, a list of runs belonging to a thread, a list of files associated with a principal, a list of models, a list of available AI models, metadata related to each AI model, a list of messages for a thread, an action, a function, a training dataset, a document, a training job, a thread, a combination thereof, and the like.

According to an embodiment, the inspector 132 is configured to inspect a network and detect network objects, such as resources deployed in a cloud computing environment 110. For example, in an embodiment, a network object is a server, a firewall, a web-access firewall (WAF), a load balancer, a gateway, a proxy server, a combination thereof, and the like.

In some embodiments, the inspector 132 is configured to detect identities deployed in the cloud computing environment 110. In an embodiment, an identity is a user account, a service account, a role, an email address, a security credential associated with an identity, a combination thereof, and the like.

In certain embodiments, the inspector 132 is configured to inspect a registry, a command-line interface (CLI), a PaaS, a SaaS, an SDK, a network, an IAM service, a resource, a combination thereof, and the like, to detect a cybersecurity object.

According to an embodiment, an inspector 132 is configured to inspect a first cloud computing environment (e.g., a production environment) and a second cloud computing environment (e.g., a development environment). This is advantageous as AI pipelines are often split among a plurality of computing environments. For example, according to an embodiment, an AI model is trained in a development environment, and deployed in a production environment.

In some embodiments, it is advantageous to generate a pipeline as a view which allows to see a complete AI pipeline through, and including, multiple cloud computing environments. This allows visibility into, for example, an AI model trained on sensitive data, which could potentially leak in a production environment, despite the sensitive data being actually stored in the development environment.

In an embodiment, the inspection environment 130 further includes an inspection controller 134. In some embodiments, the inspection controller 134 is configured to provision inspector workloads in response to detecting a demand for inspection workloads. In certain embodiments, the inspection controller 134 is configured to generate a copy, a clone, a snapshot, a combination thereof, and the like, in the cloud computing environment 110, in the inspection environment 130, and the like, based on a disk associated with a workload in the cloud computing environment 110.

In certain embodiments, it is advantageous to generate a clone of a disk, as a clone utilizes less resources than a snapshot, for example. In an embodiment, a clone is generated by generating a pointer to the same storage address of the original data, thereby providing instantaneous access to the 'cloned' disk. In certain embodiments, access to a snapshot is only provided after the snapshot process has completed generating the snapshot.

In an embodiment, the inspection environment 130 further includes a security database 136. In some embodiments, the security database 136 is configured to store a representation of the cloud computing environment 110, for example based on a predetermined data schema. In an embodiment, a unified data schema is utilized, including templates for example for representing a resource, representing a principal, representing an enrichment, representing a cybersecurity issue, a combination thereof, and the like.

In some embodiments, the security database 136 is implemented as a columnar database, a SQL database a non-SQL database, a table, a plurality of tables, a graph database, combinations thereof, and the like. For example, in an embodiment, a security database 136 is implemented as a graph database, such as Neo4j®.

In certain embodiments, the inspection environment 130 further includes an AI detector 138. In an embodiment, the AI detector 138 is configured to generate an AI pipeline. In some embodiments, an AI pipeline is a representation, for example stored in a security database 136. In an embodiment, the AI pipeline includes representations of AI components, and connections between the AI components.

For example, according to an embodiment, a dataset used for training an AI model is an AI component. In some embodiments, a dataset is determined to be used for training by detecting that a dataset stored in, for example, a storage bucket, is accessed by a serverless function configured to train an AI model. In an embodiment, the storage bucket is represented as a resource in the security database, and the representation of the storage bucket is further associated with the AI pipeline.

In certain embodiments, the AI detector 138 is configured to detect various AI components across multiple cloud computing environments. For example, in an embodiment, an AI model is trained in a first cloud computing environment (e.g., a development environment) and deployed in a second cloud computing environment (e.g., a production environment).

Therefore, in some embodiments, an AI pipeline includes components which are deployed in a plurality of cloud computing environments. In certain embodiments, the AI detector 138 is configured to detect that a component deployed in a first cloud computing environment is accessible by, or is configured to access, a component deployed in a second cloud computing environment.

In some embodiments, the cloud computing environment 110 is configured to access a service, access a platform, access a software development kit (SDK), and the like. For example, in an embodiment, the cloud computing environment 110 is configured to access an AI SaaS 150, an AI PaaS 160, an AI SDK 170, a combination thereof, and the like.

According to an embodiment, an AI SaaS 150 is, for example Google® TensorFlow®, and the like. In some embodiments, an AI PaaS 160 is, for example, OpenAI®, Hugging Face®, and the like.

Figure 2:
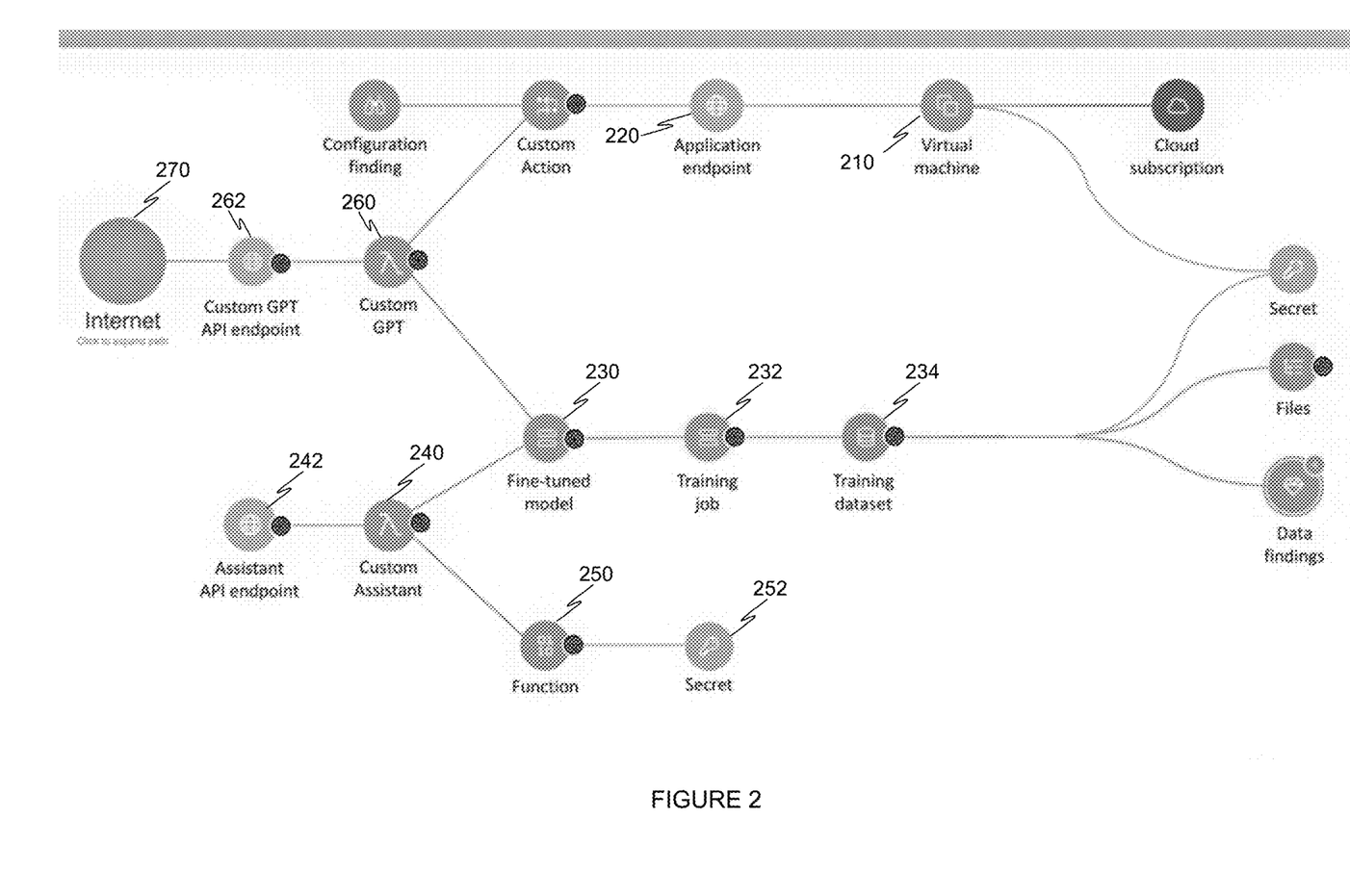
FIG. 2 is an example security graph representation of an AI pipeline, implemented in accordance with an embodiment.

FIG. 2 is an example security graph representation of an AI pipeline, implemented in accordance with an embodiment. In an embodiment, a security database is implemented as a graph database, based on a unified data schema. In some embodiments, the security database includes a plurality of nodes and connections between the nodes.

For example, in an embodiment, a node represents a resource, a principal, a cybersecurity object, a misconfiguration, a vulnerability, an exposure, a malware object, an enrichment, a remediation action, combinations thereof, and the like.

In some embodiments, a connection between nodes indicates a relationship between the objects represented by the nodes. For example, in an embodiment, a node representing an application 220 is connected to a node representing a virtual machine 210, indicating that the application represented by application node 220 is deployed on the virtual machine represented by the virtual machine node 220.

In an embodiment, a representation of a fine-tuned model 230 is generated in response to detecting a fine-tuned AI model. In some embodiments, detecting a fine-tuned model includes accessing an API of an AI SaaS provider, and pulling a list of AI models accessible by an account. In an embodiment, the account identifier is provided, for example, to an AI detector.

In certain embodiments, detecting a fine-tuned model includes detecting API calls in a networked environment directed to a known predefined AI SaaS, AI PaaS, combination thereof, and the like.

In an embodiment, a serverless function is utilized to implement a custom assistant application. In some embodiments, the serverless function is detected, for example by an inspector configured to detect virtual instances in a computing environment. In an embodiment, a representation of the serverless function is generated in a security database, for example as custom assistant node 240.

In an embodiment, an inspector is configured to detect that the custom assistant represented by the custom assistant node 240 accesses the fine-tuned model represented by fine-tuned model node 230. In some embodiments, the serverless function deploying the custom assistant includes an API through which the serverless function is configured to receive calls, represented by AI endpoint 242.

In certain embodiments, the serverless function is further configured to access a function, represented by function node 250, which in turn includes a secret, represented by secret node 252. In some embodiments, the serverless function is deployed in a production environment.

In an embodiment, a trainer is configured to train an AI model, such as a generative pre-trained transformer (GPT) model, into the fine-tuned model represented by the fine-tuned model node 230. In some embodiments, the trainer is implemented as a virtual instance in development environment, for example as a serverless function. In an embodiment, the trainer is represented by a training job node 232.

In certain embodiments, a first inspector is configured to detect the serverless function in the production environment (e.g., represented by the custom assistant node 240), and a second inspector is configured to detect the trainer (represented by the training job node 232) in the development environment.

In an embodiment, an AI detector is configured to detect a connection between the trainer and the serverless function (i.e., between the training job node 232 and the custom assistant node 240). For example, in an embodiment, the AI detector is configured to detect that the trainer is configured to store a trained AI model in a bucket, which is accessed by the serverless function.

Generating a representation including a connection between multiple computing environment to generate a pipeline is advantageous, as this allows to detect vulnerabilities, exposures, and the like, including risk combinations (e.g., vulnerability and exposure) which are not otherwise apparent when a representation includes only components of one computing environment, where a pipeline utilizes multiple components from multiple computing environments.

According to an embodiment, a trainer is configured to train an AI model using a training dataset, represented by training dataset node 234. In some embodiments, the training dataset is stored, for example as a file, a plurality of files, and the like, on a storage, such as a network-accessible storage device, a cloud based storage service, a combination thereof, and the like.

In certain embodiments, the training dataset includes sensitive data. In an embodiment, it is advantageous to maintain a separation between sensitive data in a development environment, and an application (such as the custom assistant, a custom GPT, etc.) in a production environment, where the application is exposed to an external network, such as the Internet.

For example, in an embodiment, an API endpoint (represented by custom GPT API endpoint 262) is configured to receive an input from a user account over an external network (i.e., external to where the custom GPT is deployed). In some embodiments, the API endpoint is an endpoint for a custom GPT (represented by custom GPT node 260). In an embodiment, the custom GPT is configured to utilize a fine-tuned model (represented by fine-tuned model node 230).

In some embodiments, the custom GPT is deployed in a production environment, while the trainer is deployed in a development environment. Representing the pipeline allows to detect a cybersecurity risk which is not apparent when each computing environment is viewed individually. In this example, the custom GPT is exposed to an external network (i.e., represented by the Internet node 270). In an embodiment, the custom GPT is configured to utilize the fine-tuned AI model which utilizes a training dataset that includes sensitive data.

In certain embodiments, this AI pipeline indicates a cybersecurity risk of exposing sensitive data through the custom GPT, by utilizing the fine-tuned model trained on the sensitive data.

Figure 3:
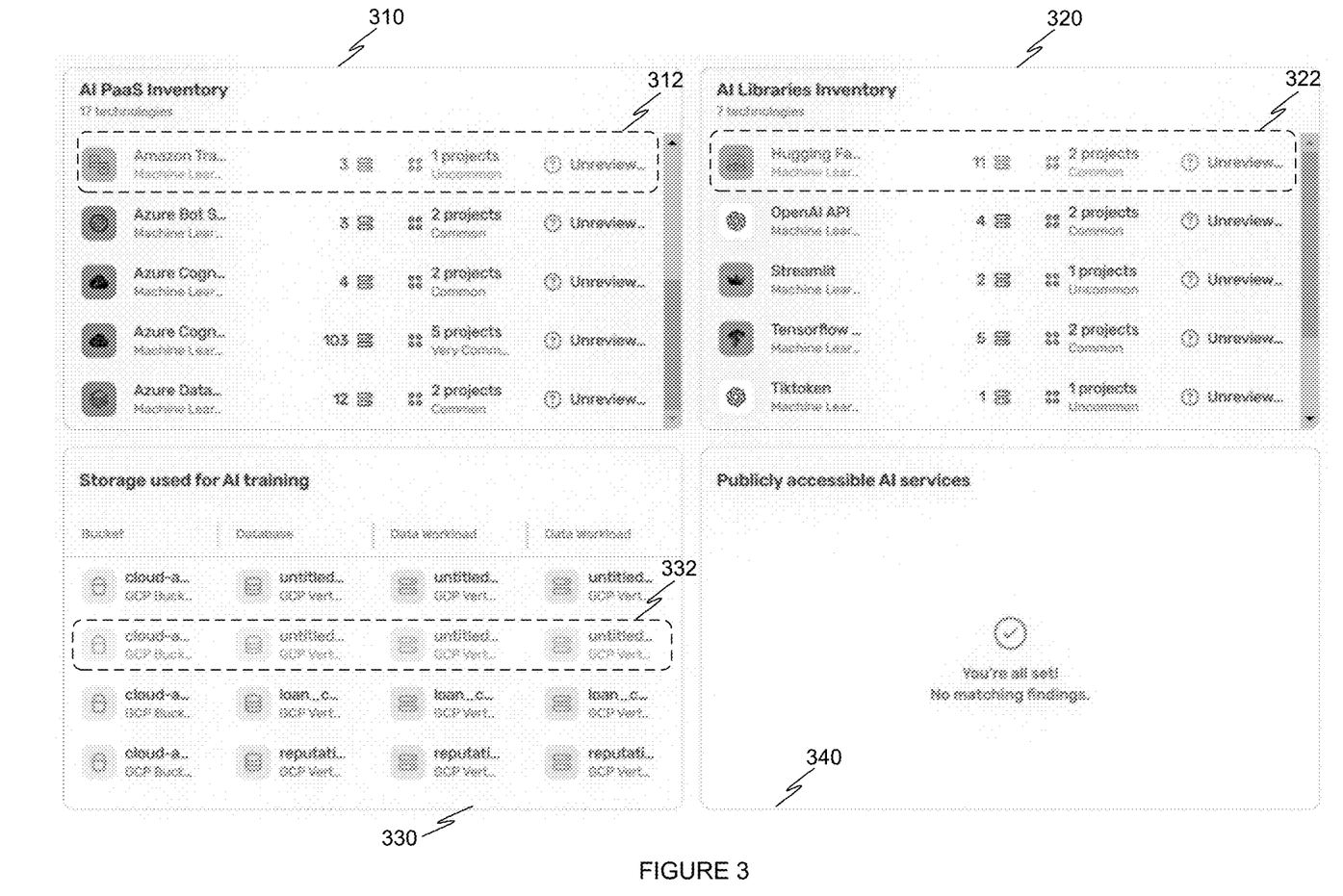
FIG. 3 is an example dashboard visualization showing an AI software bill of materials (SBOM), implemented in accordance with an embodiment.

FIG. 3 is an example dashboard visualization showing an AI software bill of materials (SBOM), implemented in accordance with an embodiment. In an embodiment, an AI SBOM is generated based on detection of a plurality of AI components deployed in a computing environments, in a combination of environments, etc.

For example, in an embodiment, an AI detector is configured to generate an AI SBOM based on data detected by an inspector. In some embodiments, an AI SBOM includes identifiers of software, an application, an endpoint, a storage device, a library, a binary, a SaaS application, a PaaS connection, a resource identifier, a principal identifier, a dataset identifier, a database identifier, combinations thereof, and the like.

In an embodiment, the dashboard includes an AI PaaS Inventory widget 310. In some embodiments, the AI PaaS Inventory widget 310 includes a plurality of rows, each row representing an AI PaaS connected to the computing environment. For example, a first row 312 includes a visual representation of an Amazon® Transcribe® service. In some embodiments, the AI PaaS inventory widget 310 includes representations of Azure® bot service, Azure cognitive services, and the like.

In certain embodiments, the dashboard includes an AI library inventory widget 320. In an embodiment, the AI library inventory widget includes various platforms, systems, libraries, and the like, which are accessible by the computing environment. For example, in an embodiment, a first row 322 includes a representation of Hugging Face®. In some embodiments, the AI library inventory widget includes representations of, for example, OpenAI® API, Streamlit, Google® Tensorflow®, Tiktoken, a combination thereof, and the like.

In an embodiment, the dashboard further includes a storage widget 330. In some embodiments, the storage widget 330 includes a visual representation of a storage device, storage service, and the like, utilized by a computing environment for AI applications, AI data, AI services, etc. For example, in an embodiment, a first row 332 represents a Google® Cloud Platform (GCP) bucket. In some embodiments, a bucket is utilized to store, for example, training data.

In certain embodiments, the dashboard includes an AI services widget 340. In some embodiments, the AI services widget 340 includes a visual representation of AI services which are publicly accessible (e.g., accessible from a network external to the computing environment, such as the Internet). In an embodiment, an AI service is determined to be a publicly accessible service in response to detecting an API endpoint associated with the AI service.

In certain embodiments, an AI detector is configured to detect an AI pipeline, and further to generate an AI dashboard based on the detected AI pipeline. In some embodiments, a widget of the AI dashboard is updated with data based on querying a representation of the AI pipeline, such as stored on a graph in a graph database, for example as discussed in more detail in FIG. 2 above.

Figure 4:
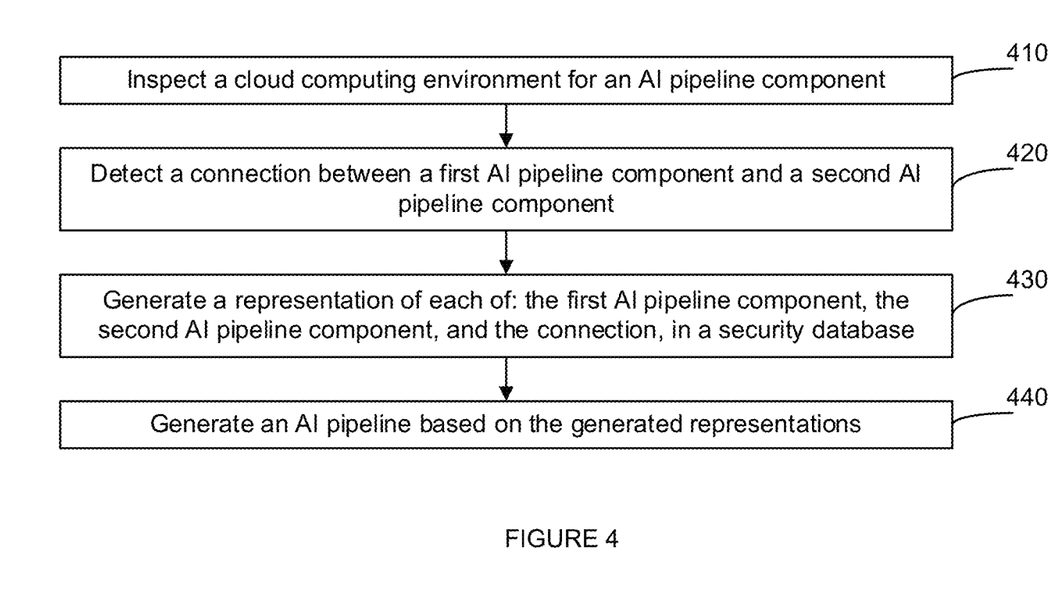
FIG. 4 is an example flowchart of a method for detecting an artificial intelligence software pipeline, implemented in accordance with an embodiment.

FIG. 4 is an example flowchart of a method for detecting an artificial intelligence software pipeline, implemented in accordance with an embodiment. In some embodiments, an AI pipeline is deployed across multiple computing environments, multiple accounts, utilizing multiple resources, principals, SaaS providers, PaaS provides, combinations thereof, and the like. It is therefore advantageous to generate a representation of the entire AI pipeline, including all components, in order to detect cybersecurity risks, mitigate cybersecurity issues, remediate cybersecurity exposures, exploited vulnerabilities, and the like. It is further advantageous as an AI pipeline is often also deployed across time, e.g., the AI model is trained in a first environment at a first time, and deployed in a second environment at a second time. An AI pipeline lends visibility to this process of bridging computing environments, and bridging time.

At S410, a computing environment is inspected for an AI component. In an embodiment, an AI component is utilized by an AI system. For example, in certain embodiments, an AI model utilizes a storage for storing training data, a training workload utilized to train the AI model, an application for providing input to the trained model, an API to receive calls and utilize the application which utilizes the AI model, and API endpoint to connect the API to an external network, various combinations thereof, and the like. In this example, each such component is an AI component.

In an embodiment, an AI component is detected by an inspector configured to inspect a computing environment, such as a cloud computing environment, a hybrid computing environment, a networked computing environment, a combination thereof, and the like.

In some embodiments, an inspector is configured to detect a cybersecurity object, such as an application, an operating system, a nested workload, a certificate, a password, a cryptographic key, an identity, a library, a binary, a software development kit (SDK), a registry file, a combination thereof, and the like.

In certain embodiments, an inspector is configured to inspect a network of a computing environment (i.e., network inspection) and detect network components, such as firewalls, load balancers, gateways, endpoints, open ports, network paths (including, for example, TCP/IP communication, UDP communication, combinations thereof, and the like).

In some embodiments, an inspector is configured to inspect a cloud computing environment (e.g., cloud scanning) to detect various resources, principals, cloud entities, and the like, which are deployed in the cloud computing environment.

In an embodiment, an inspector is configured to perform static analysis of applications, of SDKs, of registry files, infrastructure as code (IaC) code objects, command line interface (CLI) inspection, a combination thereof, and the like. In some embodiments, the inspector is configured to detect AI components by performing such static analysis.

In certain embodiments, an AI detector is configured to query an identity and access management (IAM) service to detect identities, principals, user accounts, service accounts, roles, combinations thereof, and the like, which are utilized as AI components (i.e., in the AI pipeline). In an embodiment, an identity is determined to be utilized as an AI component in response to detecting a permission which authorizes the identity to act on another AI component (e.g., act on a resource of the AI pipeline).

In some embodiments, an identity is determined to be utilized as an AI component, and a further detection is performed to determine if the identity is authorized to access components, resources, and the like, which are not already identified as AI components.

For example, according to an embodiment, a first identity is determined to be utilized in an AI pipeline in response to determining that the first identity includes a permission to initiate an action in a cloud computing environment on a resource identified as an AI component. In an embodiment, the AI detector is configured to detect additional resources which the first identity has a permission to initiate an action thereupon. In some embodiments, the additional resources are further determined to be AI components.

In some embodiments, an AI detector is configured to determine if a component detected by the inspector is an AI component.

At S420, a connection is detected between AI components. In an embodiment, the connection is detected between a first AI component, and a second AI component. In some embodiments, the connection is detected in response to detecting a shared resource that both AI components act on. In certain embodiments, a connection is detected by querying an IAM service to detect resources which a principal (determined to be an AI component) is authorized to act on.

In an embodiment, an AI detector is configured to detect a connection between AI components, based on, for example, a result of an inspector performing inspection in a computing environment.

In some embodiments, the AI detector is configured to detect a connection between a first AI component deployed in a first computing environment (e.g., a production environment), and a second AI component deployed in a second computing environment (e.g., a development environment).

At S430, a representation is generated in a security database. In an embodiment, a representation is generated for each of: the first AI component, for the second AI component, the connection, etc. In some embodiments, a representation is generated based on a unified data model, such that a resource detected in a first computing environment is represented using the same model as a resource detected in a second computing environment which is different than the first computing environment.

In certain embodiments, the security database is implemented as a graph database, such as a Neo4j® database. In an embodiment, a representation is stored as a node in the graph database. In some embodiments, a relationship between a first AI component and a second AI component, is represented as a connection between representations, e.g., a connection between nodes.

At S440, an AI pipeline is generated. In an embodiment, the AI pipeline includes a representation of an AI pipeline, such as a visual representation. In some embodiments, the AI pipeline includes a plurality of AI components, and the connections between such AI components.

In an embodiment, an AI pipeline includes any of: a cybersecurity finding, a representation of an API endpoint, a representation of an application, a representation of an AI model, a representation of a function, a representation of a virtualization, a representation of a training job, a representation of a training dataset, a representation of a secret, a representation of a computing environment, a representation of an account, a representation of a data, a representation of a data type, any combination thereof, and the like.

In an embodiment, generating an AI pipeline includes generating a visual representation, including a corresponding graphic for each data representation of an AI component, and a graphic representing connections between the different graphics. A visual representation of an AI pipeline is discussed in more detail with respect to FIG. 2, which is an example of one such visual representation.

In some embodiments, it is advantageous to generate a visual representation of an AI pipeline, as AI applications are often deployed across multiple computing environments, include multiple external software providers (e.g., SaaS and PaaS providers), etc.

In certain embodiments, an AI detector is further configured to detect cybersecurity risks based on detecting a plurality of AI components, and further based on detecting a connection between a plurality of AI components.

Figure 5:
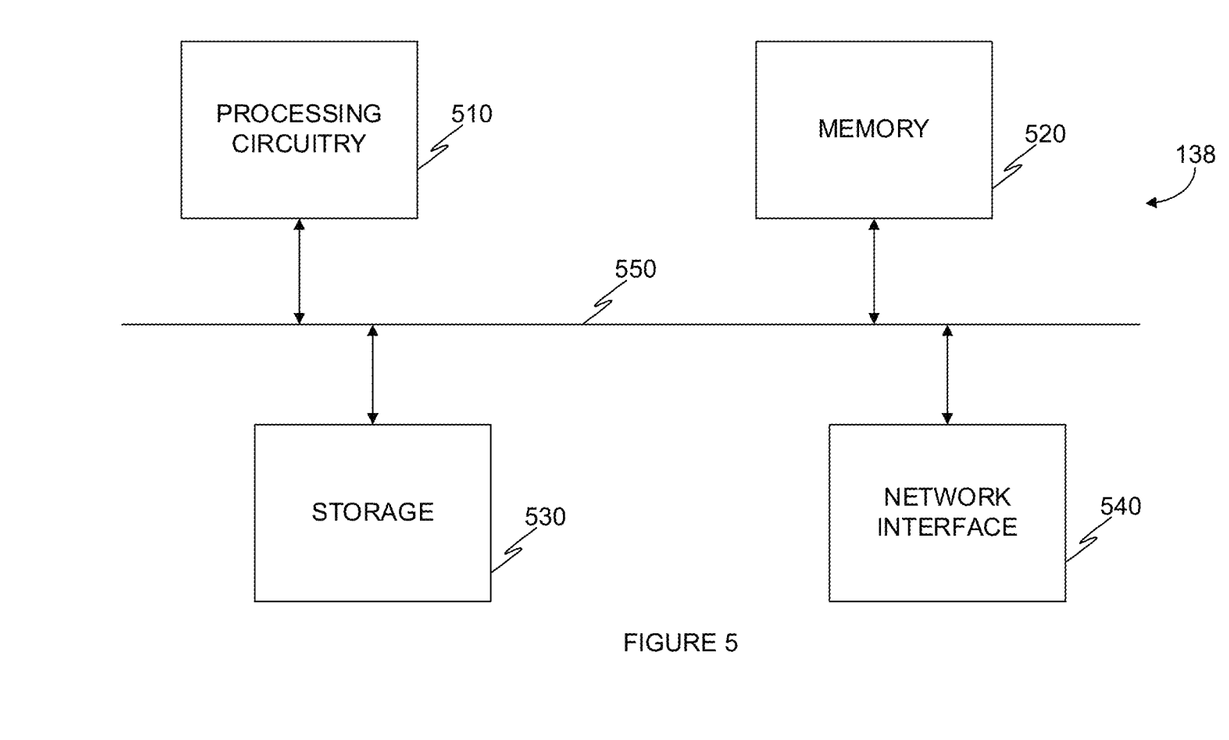
FIG. 5 is an example schematic diagram of an AI detector according to an embodiment.

FIG. 5 is an example schematic diagram of an AI detector 138 according to an embodiment. The AI detector 138 includes a processing circuitry 510 coupled to a memory 520, a storage 530, and a network interface 540. In an embodiment, the components of the AI detector 138 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the AI detector 138 with communication with, for example, the inspector 132, the inspection controller 134, the security database 136, and the like.

It should be understood that the embodiments described herein are not limited to the specific architecture illustrated in FIG. 5, and other architectures may be equally used without departing from the scope of the disclosed embodiments.

Furthermore, in certain embodiments the inspector 132, the inspection controller 134, the security database 136, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting an artificial intelligence (AI) pipeline in a cloud computing environment, comprising:
   querying a cloud computing environment application programming interface (API) to detect a plurality of entities deployed in the cloud computing environment;
   inspecting each entity of the plurality of entities deployed in the cloud computing environment for an AI pipeline component;
   detecting a connection between a first AI pipeline component and a second AI pipeline component;
   inspecting a workload of the cloud computing environment to detect an AI model, wherein the AI model is stored in a disk associated with the workload;
   generating in a security database a digital representation of each of: the first AI pipeline component, the second AI pipeline component, the connection, and the AI model;
   generating an AI pipeline representation based on the generated representations;
   analyzing the AI pipeline representation to detect a security risk; and
   remediating the detected security risk.

2. The method of claim 1, further comprising:
   inspecting a workload of the cloud computing environment to detect an AI service; and
   generating in the security database a digital representation of the AI service.

3. The method of claim 1, further comprising:
generating a clone of the disk associated with the workload; and
inspecting the clone of the disk for the AI model.

4. The method of claim 3, further comprising:
releasing the clone of the disk in response to determining that inspection of the clone of the disk is complete.

5. The method of claim 1, further comprising:
detecting the AI model in a production environment.

6. The method of claim 5, further comprising:
detecting the AI model further in any one of: a test environment, a staging environment, a development environment, and any combination thereof.

7. The method of claim 1, further comprising:
inspecting the first AI pipeline component for any one of: a software development kit (SDK), a library, an application, a framework, a service, a training data, an extension, a plugin, and any combination thereof.

8. The method of claim 1, further comprising:
detecting an AI Software as a Service (SaaS) connected to the cloud computing environment; and
updating the AI pipeline to include the AI SaaS.

9. The method of claim 1, further comprising:
detecting an AI Platform as a Service (PaaS) connected to the cloud computing environment; and
updating the AI pipeline to include the AI PaaS.

10. A non-transitory computer-readable medium storing a set of instructions for detecting an artificial intelligence (AI) pipeline in a cloud computing environment, the set of instructions comprising:
one or more instructions that, when executed by one or more processors of a device, cause the device to:
querying a cloud computing environment application programming interface (API) to detect a plurality of entities deployed in the cloud computing environment;
inspect each entity of the plurality of entities deployed in the cloud computing environment for an AI pipeline component;
detect a connection between a first AI pipeline component and a second AI pipeline component;
inspect a workload of the cloud computing environment to detect an AI model, wherein the AI model is stored in a disk associated with the workload;
generate in a security database a digital representation of each of: the first AI pipeline component, the second AI pipeline component, the connection, and the AI model;
generate an AI pipeline representation based on the generated representations; and
analyze the AI pipeline representation to detect a security risk; and
remediate the detected security risk.

11. A system for detecting an artificial intelligence (AI) pipeline in a cloud computing environment comprising:
a processing circuitry;
a memory, the memory containing instructions that, when executed by the processing circuitry, configure the system to:
query a cloud computing environment application programming interface (API) to detect a plurality of entities deployed in the cloud computing environment;
inspect each entity of the plurality of entities deployed in the cloud computing environment for an AI pipeline component;
detect a connection between a first AI pipeline component and a second AI pipeline component;
inspect a workload of the cloud computing environment to detect an AI model, wherein the AI model is stored in a disk associated with the workload;
generate in a security database a digital representation of each of: the first AI pipeline component, the second AI pipeline component, and the connection;
generate an AI pipeline representation based on the generated representations; and
analyze the AI pipeline representation to detect a security risk; and
remediate the detected security risk.

12. The system of claim 11, wherein the memory contains further instructions which when executed by the processing circuitry further configure the system to:
inspect a workload of the cloud computing environment to detect an AI service; and
generate in the security database a digital representation of the AI service.

13. The system of claim 11, wherein the memory contains further instructions which when executed by the processing circuitry further configure the system to:
generate a clone of the disk associated with the workload; and
inspect the clone of the disk for the AI model.

14. The system of claim 13, wherein the memory contains further instructions which when executed by the processing circuitry further configure the system to:
release the clone of the disk in response to determining that inspection of the clone of the disk is complete.

15. The system of claim 11, wherein the memory contains further instructions which when executed by the processing circuitry further configure the system to:
detect the AI model in a production environment.

16. The system of claim 15, wherein the memory contains further instructions which when executed by the processing circuitry further configure the system to:
detect the AI model further in any one of:
a test environment, a staging environment, a development environment, and any combination thereof.

17. The system of claim 11, wherein the memory contains further instructions which when executed by the processing circuitry further configure the system to:
inspect the first AI pipeline component for any one of:
a software development kit (SDK), a library, an application, a framework, a service, a training data, an extension, a plugin, and any combination thereof.

18. The system of claim 11, wherein the memory contains further instructions which when executed by the processing circuitry further configure the system to:
detect an AI Software as a Service (SaaS) connected to the cloud computing environment; and
update the AI pipeline to include the AI SaaS.

19. The system of claim 11, wherein the memory contains further instructions which when executed by the processing circuitry further configure the system to:
detect an AI Platform as a Service (PaaS) connected to the cloud computing environment; and
update the AI pipeline to include the AI PaaS.

* * * * *